F. D. HOWE.
BRAKE.
APPLICATION FILED JUNE 18, 1915.

1,295,505.

Patented Feb. 25, 1919.

Inventor:
Frank D. Howe,
By Chas. E. Lord
Atty.

UNITED STATES PATENT OFFICE.

FRANK D. HOWE, OF AKRON, OHIO, ASSIGNOR, BY MESNE ASSIGNMENTS, TO INTERNATIONAL HARVESTER COMPANY, A CORPORATION OF NEW JERSEY.

BRAKE.

1,295,505.   Specification of Letters Patent.   Patented Feb. 25, 1919.

Application filed June 18, 1915. Serial No. 34,854.

*To all whom it may concern:*

Be it known that I, FRANK D. HOWE, a citizen of the United States, residing at Akron, in the county of Summit and State of Ohio, have invented certain new and useful Improvements in Brakes, of which the following is a full, clear, and exact specification.

This invention relates to brakes.

The main object of my invention is to improve the efficiency of brakes.

Another object is to provide a simple and inexpensive brake adapted to meet the requirements for successful commercial operation.

The invention is illustrated on the accompanying sheet of drawings, in which—

Figure 1:
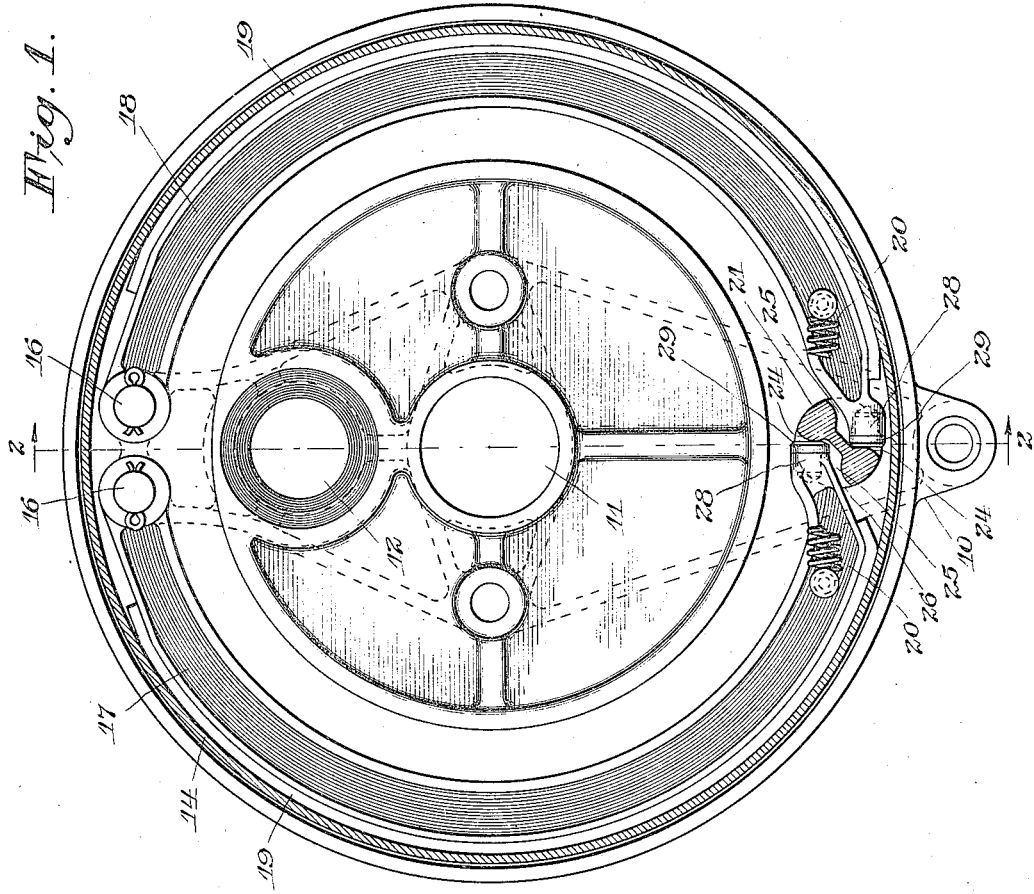
Figure 2:
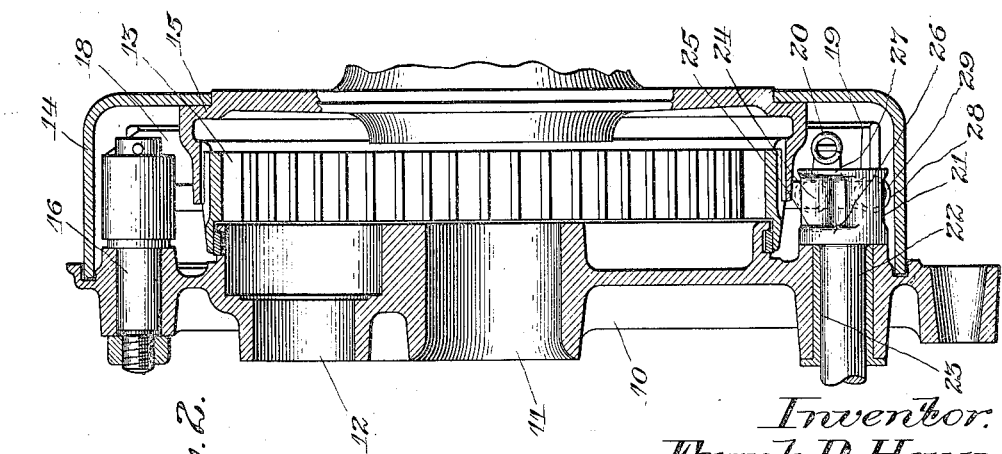

Figure 1 is a side elevation, parts being in section, of a brake embodying my invention; and Fig. 2 is a transverse sectional view of the same taken substantially in the plane of line 2—2 of Fig. 1.

The various novel features of my invention will be apparent from the following description and drawing, and will be particularly set forth in the appended claims.

The invention finds particular application in connection with brakes used on auto vehicles, and for this reason that type of brake will described.

This brake has a stationary supporting member 10, having a central opening 11 for the reception of a rear dead axle, upon the ends of which the rear vehicle wheels are mounted (neither the dead axle nor the wheels being shown). This stationary member 10 also is provided with an opening 12 through which may pass a live axle having a pinion (neither being shown) for meshing with an internal gear 13 connected to a suitable rotatable brake element 14 through a suitable connecting member 15 properly arranged with respect to parts 13 and 14 to transmit motion therebetween. Pivotally mounted upon studs 16 supported in the stationary member 10 are brake shoes 17 and 18, on the outer surfaces of which is secured suitable friction material 19 for engaging the inner annular surface of the rotatable brake element or flange 14. The brake shoes are yieldably connected at their free ends by a spring 20 tending to hold the brake shoes out of engagement with the rotatable brake element 14.

Thus far, the mentioned parts, in themselves, are standard. While this general type of brake which has been in use for years is considered to be one of the best, nevertheless it has given more or less trouble due to the fact that the efficiency and dependability of the brake decrease materially as the friction material 19 becomes worn. At the same time, the types of cams which have been used to force the brake shoes into engagement with the rotatable brake element, have proven inefficient, due to the fact largely that they become worn by their sliding action over the ends of the brake shoes.

To overcome all of the above mentioned objectionable features, I have provided a suitable and improved cam adapted to coöperate with the brake shoes for obtaining the best results. This cam 21 is mounted at one end of a rotary reciprocating control member 22 which passes through an opening 23 in the stationary supporting member 10. This cam 21 has oppositely arranged curved working surfaces 24 formed in oppositely arranged hollow or recessed portions 25 of a cylindrical piece of metal having opposed flanged portions 26 and 27, between which the end portions 28 of the shoes 17 and 18 are retained against lateral movement. The end portions 28 of the brake shoes are provided with hardened steel buttons 29 which are held in engagement with the curved working surfaces 24 by spring 20.

As shown in Fig. 1, the brake is in off or release position, and it will be noted that the engaging and working surfaces of the cam and the hardened steel buttons are located approximately on the center line at right angles to the direction of motion of these surfaces when the brake is applied; also the engaging surfaces of the cams and buttons are in a plane passing through the axis of the cam or controlled member. It is to be noted further that as the cam is actuated, its working surfaces 24 roll over the hardened steel buttons 29 on the ends of the brake shoes rather than slide on said buttons, in this way reducing the wearing of the parts in question to a minimum. It will be noted also that the leverage of the cam on the brake shoes remains substantially constant regardless of the amount of wear of the friction element secured to the brake shoes and which engages the rotatable brake element. In this way this cam member, formed out of a recessed piece of suitable metal, not only prevents lateral movement of the ends of the brake shoes, but also coöperates with said brake shoes in a manner to meet the requirements for successful commercial operation. As viewed in Fig. 1, it will be seen that the cam portions 21 form a web between the flanged portions 26 and 27.

It is evident that there may be modifications in the precise arrangement herein shown and described, and it is my intention to cover all such modifications which do not involve a departure from the spirit and scope of my invention.

What I claim as new is:

1. In a brake, a rotatable element, brake shoes having flat ends associated therewith, and means having a rolling contact with the flat ends of said shoes for forcing the latter into engagement with said rotatable element.

2. In a brake, a rotatable element, brake shoes having flat ends associated therewith, and a cam member having a rolling contact with the flat ends of said shoes for forcing said shoes into engagement with said rotatable element.

3. In a brake, a rotatable element, a brake shoe associated therewith, and a single member of I-beam cross-section having a cam portion for forcing said shoe into engagement with said rotatable element and having oppositely arranged flanged portions for preventing lateral movement of said shoe.

4. In a brake, a rotatable element, brake shoes associated therewith having off-set ends normally lying in substantially the same plane, a member having recessed portions for the reception of the ends of said shoes to prevent lateral movement thereof, and intermediate cam portions formed therein by means of which said shoes may be forced into engagement with said rotatable element.

5. In a brake, a rotatable element, brake shoes associated therewith, and a controlled recessed member having cam surfaces which normally engage coöperating surfaces of said brake shoes in a vertical plane passing substantially through the axis of said controlled member.

6. In a brake, a brake drum, brake shoes associated therewith having offset ends, a rotatable cam therebetween having cam faces for engagement with the offset ends.

7. In a brake, a brake drum, brake shoes associated therewith having offset ends in substantially the same plane, a rotatable cam therebetween having cam faces for engagement with the offset ends.

8. An internally expansible brake having a brake drum, brake shoes with which said brake drum coöperates, the ends of said shoes having flattened portions lying normally in substantially the same plane, and a rotatable member coöperating with said flattened ends, whereby the brake shoes may be brought into contact with the brake drum.

In testimony whereof I affix my signature.

FRANK D. HOWE.